United States Patent
Sobanski et al.

(10) Patent No.: US 12,163,470 B2
(45) Date of Patent: Dec. 10, 2024

(54) HEAT EXCHANGER(S) FOR RECOVERING WATER AND/OR HEAT ENERGY FROM TURBINE ENGINE COMBUSTION PRODUCTS

(71) Applicant: Raytheon Technologies Corporation, Farmington, CT (US)

(72) Inventors: Jon E. Sobanski, Glastonbury, CT (US); Jacob C. Snyder, East Haddam, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/117,916

(22) Filed: Mar. 6, 2023

(65) Prior Publication Data

US 2024/0301830 A1    Sep. 12, 2024

(51) Int. Cl.
*F02C 7/141* (2006.01)
*F02C 3/22* (2006.01)
*F02C 3/30* (2006.01)

(52) U.S. Cl.
CPC ............ *F02C 7/141* (2013.01); *F02C 3/22* (2013.01); *F02C 3/30* (2013.01); *F05D 2260/606* (2013.01)

(58) Field of Classification Search
CPC ........ F01K 23/06; F01K 23/10; F01K 23/101; F01K 23/103; F01K 23/105; F01K 23/106; F01K 23/108; F01D 25/32; F02C 3/30; F02C 3/305; F02C 7/12; F02K 3/00; F02K 3/02; F02K 3/025; F02K 3/04; F02K 3/06; F02K 3/068; F02K 3/077; F02K 3/08; F02K 3/105; F02K 3/115
See application file for complete search history.

(56) References Cited

U.S. PATENT DOCUMENTS

| | | | |
|---|---|---|---|
| 2,633,338 A | * | 3/1953 | Hiersch ............... F28D 7/026 165/145 |
| 3,266,564 A | | 8/1966 | Sabatiuk |
| 3,604,207 A | | 9/1971 | Waidelich |
| 3,646,760 A | | 3/1972 | Waidelich |
| 9,410,478 B2 | | 8/2016 | Loebig |

(Continued)

OTHER PUBLICATIONS

EP Search Report for EP Patent Application No. 24154822.1 dated Jul. 3, 2024.

*Primary Examiner* — Todd E Manahan
*Assistant Examiner* — Sean V Meiller
(74) *Attorney, Agent, or Firm* — Getz Balich LLC

(57) ABSTRACT

A turbine engine is provided that includes a fan section, a turbine engine core, an evaporator, a condenser, a core flowpath and a bypass flowpath. The turbine engine core is configured to power the fan section. The turbine engine core includes a core compressor section, a core combustor section and a core turbine section. The evaporator is arranged axially along an axis between the fan section and the turbine engine core. The condenser is arranged axially along the axis between the fan section and the turbine engine core. The core flowpath extends sequentially through the core compressor section, the core combustor section, the core turbine section, the evaporator and the condenser. The bypass flowpath is fluidly coupled with and downstream of the fan section. The bypass flowpath is radially outboard of and extends axially along the evaporator and the condenser.

18 Claims, 8 Drawing Sheets

(56) References Cited

U.S. PATENT DOCUMENTS

| | | | |
|---|---|---|---|
| 9,523,329 B2 * | 12/2016 | Kupratis | .................. F02K 1/80 |
| 2015/0192069 A1 | 7/2015 | Gekht | |
| 2021/0207500 A1 * | 7/2021 | Klingels | ................ F01K 23/10 |
| 2023/0286661 A1 * | 9/2023 | Klingels | ................ B64D 29/06 |

* cited by examiner

HEAT EXCHANGER(S) FOR RECOVERING WATER AND/OR HEAT ENERGY FROM TURBINE ENGINE COMBUSTION PRODUCTS

GOVERNMENT LICENSE RIGHTS

This invention was made with Government support under Contract DE-AR0001561 awarded by the United States Department of Energy, Office of ARPA-E. The Government has certain rights in this invention.

BACKGROUND OF THE DISCLOSURE

1. Technical Field

This disclosure relates generally to a turbine engine and, more particularly, to recovering water and/or heat energy from combustion products of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor, and exhausted combustion products carry waste heat energy. Various systems and methods are known in the art for recovering the water vapor and/or the heat energy. While these known systems and methods have various advantages, there is still room in the art for improvement.

SUMMARY OF THE DISCLOSURE

According to an aspect of the present disclosure, a turbine engine is provided that includes a fan section, a turbine engine core, an evaporator, a condenser, a core flowpath and a bypass flowpath. The turbine engine core is configured to power the fan section. The turbine engine core includes a core compressor section, a core combustor section and a core turbine section. The evaporator is arranged axially along an axis between the fan section and the turbine engine core. The condenser is arranged axially along the axis between the fan section and the turbine engine core. The core flowpath extends sequentially through the core compressor section, the core combustor section, the core turbine section, the evaporator and the condenser. The bypass flowpath is fluidly coupled with and downstream of the fan section. The bypass flowpath is radially outboard of and extends axially along the evaporator and the condenser.

According to another aspect of the present disclosure, another turbine engine is provided that includes a first rotating structure, a turbine engine core, an evaporator, a condenser and a core flowpath. The first rotating structure is rotatable about an axis. The first rotating structure includes a propulsor rotor and a power turbine rotor. The turbine engine core includes a second rotating structure and a combustor. The second rotating structure includes a core compressor rotor and a core turbine rotor. The power turbine rotor is arranged axially between the propulsor rotor and the second rotating structure. The evaporator is arranged axially between the propulsor rotor and the power turbine rotor. The condenser is arranged axially between the propulsor rotor and the power turbine rotor. The core flowpath extends sequentially across the core compressor rotor, the combustor, core turbine rotor, the power turbine rotor, the evaporator and the condenser.

According to still another aspect of the present disclosure, another turbine engine is provided that includes a fan section, a turbine engine core, an evaporator, a condenser, a core flowpath and a bypass flowpath. The turbine engine core is configured to power the fan section. The turbine engine core includes a core compressor section, a core combustor section and a core turbine section. The evaporator extends circumferentially about an axis. The condenser extends circumferentially about the axis. The core flowpath extends sequentially through the core compressor section, the core combustor section, the core turbine section, the evaporator and the condenser. The core flowpath extends in a radial inward direction through the evaporator. The core flowpath extends in a radial outward direction through the condenser. The bypass flowpath is fluidly coupled with and downstream of the fan section. The bypass flowpath is radially outboard of and extends axially along the evaporator and the condenser.

The evaporator may be arranged axially between the fan section and the turbine engine core. In addition or alternatively, the condenser may be arranged axially between the fan section and the turbine engine core.

The turbine engine may also include a fan section and a bypass flowpath. The fan section may include the propulsor rotor. The bypass flowpath may be fluidly coupled with and downstream of the fan section. The bypass flowpath may be radially outboard of and extend axially along the evaporator and the condenser.

The condenser may be arranged axially between the fan section and the evaporator.

The evaporator may extend circumferentially about the axis.

The core flowpath may extend radially through the evaporator.

The core flowpath may extend in a radial inward direction into the evaporator.

The condenser may extend circumferentially about the axis.

The core flowpath may extend radially through the condenser.

The core flowpath may extend in a radial outward direction into the condenser.

The turbine engine may also include a recovery system, and the recovery system may include the condenser and the evaporator. The condenser may be configured to condense water vapor flowing through the core flowpath into water, and the recovery system may be configured to collect the water. The evaporator may be configured to evaporate at least some of the water into steam, and the recovery system may be configured to provide the steam to the turbine engine core.

The recovery system may be configured to provide the steam to the combustor section.

The turbine engine may also include a fuel system configured to inject hydrogen fuel into a combustion chamber of the combustor section for combustion.

The turbine engine may also include a flow circuit, and the flow circuit may include the condenser and a second condenser. The flow circuit may be configured to circulate a working fluid through the condenser and the second condenser. The second condenser may be arranged radially outboard of the fan section and/or the bypass flowpath.

The turbine engine may also include a scoop configured to direct air from the fan section into the second condenser.

The turbine engine may also include a scoop configured to direct air from outside of the turbine engine into the second condenser.

The core flowpath may extend to a core flowpath exhaust. The bypass flowpath may extend to a bypass flowpath exhaust disposed radially outboard and axially forward of the core flowpath exhaust.

The turbine engine core may have a reverse flow configuration.

The core turbine section may be arranged axially between the evaporator and the core compressor section.

The turbine engine may also include a power turbine section and a rotating structure. The power turbine section may be arranged axially between the evaporator and the turbine engine core. The rotating structure may include a fan rotor and a power turbine rotor. The fan rotor may be within the fan section, and the power turbine rotor may be within the power turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
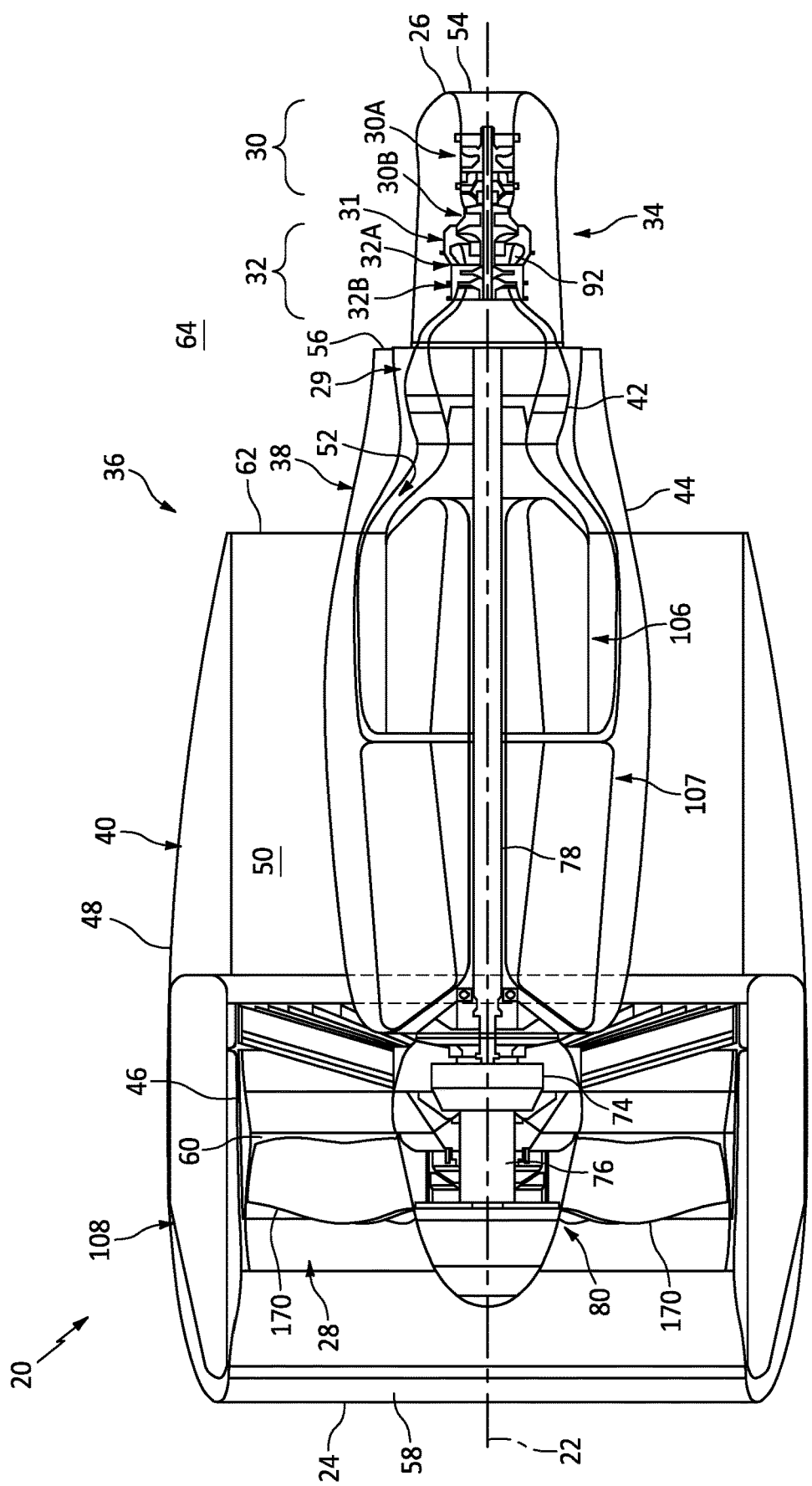
FIG. 1 is a side sectional illustration of a gas turbine engine.

FIG. 1 is a side sectional illustration of a gas turbine engine 20 for an aircraft propulsion system. This turbine engine 20 extends axially along a centerline axis 22 between a forward, upstream end 24 and an aft, downstream end 26. The turbine engine 20 includes a fan section 28, a power turbine (PT) section 29 and a turbine engine core 34; e.g., gas generator. The engine core 34 includes a core compressor section 30, a core combustor section 31 and a core turbine section 32. The core compressor section 30 of FIG. 1 includes a low pressure compressor (LPC) section 30A and a high pressure compressor (HPC) section 30B. The core turbine section 32 of FIG. 1 includes a high pressure turbine (HPT) section 32A and a low pressure turbine (LPT) section 32B.

The fan section 28, the PT section 29 and the engine core 34 are arranged sequentially along the axis 22 within an engine housing 36. This engine housing 36 includes a housing inner structure 38 and a housing outer structure 40. The housing inner structure 38 includes an inner case 42 and an inner nacelle 44, and the housing outer structure 40 includes an outer case 46 and an outer nacelle 48. The inner case 42 may house one or more of the engine sections 29-32B; see also FIG. 2. The outer case 46 may house at least the fan section 28. The inner nacelle 44 houses and provides an aerodynamic cover over at least the inner case 42. The outer nacelle 48 houses and provides an aerodynamic cover over at least the outer case 46. The outer nacelle 48 of FIG. 1 is also disposed radially outboard of, extends circumferentially about (e.g., circumscribes) and extends axially along (e.g., overlaps) at least a forward portion of the inner nacelle 44. With this arrangement, the inner nacelle 44 and the outer nacelle 48 form a bypass flowpath 50 within the engine housing 36.

A core flowpath 52 extends sequentially through the LPC section 30A, the HPC section 30B, the core combustor section 31, the HPT section 32A, the LPT section 32B and the PT section 29 from an inlet 54 into the core flowpath 52 to an exhaust 56 out from the core flowpath 52. The core flowpath inlet 54 of FIG. 1 is disposed at (e.g., on, adjacent or proximate) the engine downstream end 26. The core flowpath exhaust 56 of FIG. 1 is disposed axially forward, upstream of the core flowpath inlet 54. The core flowpath exhaust 56 of FIG. 1, for example, is disposed radially outboard of and may be axially aligned with the PT section 29. By contrast, an inlet 58 into the turbine engine 20 of FIG. 1 is disposed at the engine upstream end 24. An inlet 60 to the bypass flowpath 50 is disposed downstream of the fan section 28 and axially aft, downstream of the engine inlet 58. An exhaust 62 from the bypass flowpath 50 is disposed axially aft, downstream of the bypass flowpath inlet 60. This bypass flowpath exhaust 62 of FIG. 1 is also radially outboard of the core flowpath 52 and its core flowpath exhaust 56. The bypass flowpath exhaust 62 may be disposed axially forward, upstream of the core flowpath exhaust 56.

Figure 2:
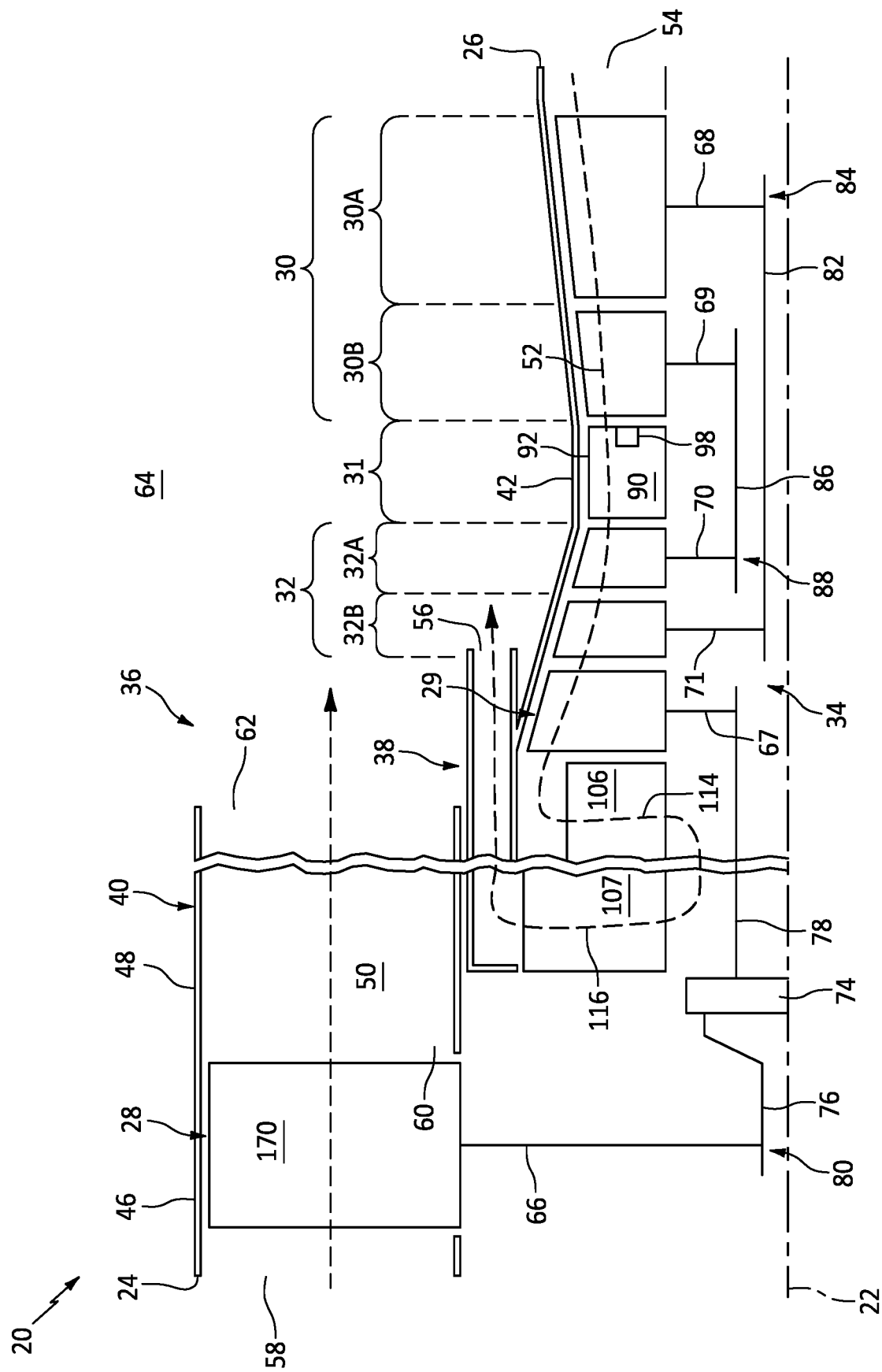
FIG. 2 is a partial schematic illustration of the turbine engine.

Referring to FIG. 2, the engine core 34 may be configured as a reverse flow engine core. The core flowpath 52 of FIG. 2, for example, extends through any one or more or all of the engine sections 30A-32B and 29 in an axially forward direction. Similarly, the turbine engine 20 is configured to move through an environment 64 external (e.g., outside of) to the turbine engine 20 in the axially forward direction; e.g., during forward aircraft flight. By contrast, the bypass flowpath 50 extends axially within the turbine engine 20 and its engine housing 36 in an axially aft direction that is opposite the axially forward direction. With such an arrangement, the engine sections 30A-32B, 29 and 28 may be arranged sequentially along the axis 22 between the engine downstream end 26 and the engine upstream end 24.

Each of the engine sections 28, 29, 30A, 30B, 32A and 32B of FIG. 2 includes a respective bladed rotor 66-71. Each of these bladed rotors 66-71 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 66 is connected to a geartrain 74 through a fan shaft 76. The geartrain 74 is connected to the power turbine (PT) rotor 67 through a power turbine (PT) shaft 78. At least (or only) the fan rotor 66, the fan shaft 76, the geartrain 74, the PT shaft 78 and the PT rotor 67 collectively form a fan rotating structure 80. This fan rotating structure 80 of FIG. 2 is configured as a geared rotating structure where, for example, the PT rotor 67 rotates at a different (e.g., faster) speed than the fan rotor 66. However, it is contemplated the fan rotating structure 80 may alternatively be a direct drive rotating structure where, for example, the fan shaft 76 and the geartrain 74 are omitted and the PT shaft 78 directly connects the fan rotor 66 and the PT rotor 67 together. Referring again to FIG. 2, the LPC rotor 68 is connected to the LPT rotor 71 through a low speed shaft 82. At least (or only) the LPC rotor 68, the low speed shaft 82 and the LPT rotor 71 collectively form a low speed rotating structure 84 of the engine core 34. The HPC rotor 69 is connected to the HPT rotor 70 through a high speed shaft 86. At least (or only) the HPC rotor 69, the high speed shaft 86 and the HPT rotor 70 collectively form a high speed rotating structure 88 of the engine core 34. Each of the engine rotating structures 80, 84, 88 may be rotatable about the axis 22. These engine rotating structures 80, 84 and 88 may be rotatably connected to and supported by the engine housing 36 through a plurality of bearings.

During operation, air enters the turbine engine 20 and its engine core 34 at the engine downstream end 26 through the core flowpath inlet 54. This air directed into the core flowpath 52 may be referred to as "core air". Air also enters the turbine engine 20 at the engine upstream end 24 through the engine inlet 58. This air is directed through the fan section 28 and into the bypass flowpath 50. The air within the bypass flowpath 50 may be referred to as "bypass air".

The core air is compressed by the LPC rotor 68 and the HPC rotor 69 and directed into a combustion chamber 90 of a combustor 92 (e.g., an annular combustor) in the combustor section 31. Fuel is injected into the combustion chamber 90 and mixed with the compressed core air to provide a fuel-air mixture. This fuel-air mixture is ignited and combustion products thereof flow through and sequentially cause the HPT rotor 70, the LPT rotor 71 and the PT rotor 67 to rotate. The rotation of the HPT rotor 70 and the LPT rotor 71 respectively drive rotation of the HPC rotor 69 and the LPC rotor 68 and, thus, compression of the air received from the core flowpath inlet 54. The rotation of the PT rotor 67 (e.g., independently) drives rotation of the fan rotor 66, which propels the bypass air through and out of the bypass flowpath 50. The propulsion of the bypass air may account for a majority of thrust generated by the turbine engine 20.

Figure 3:
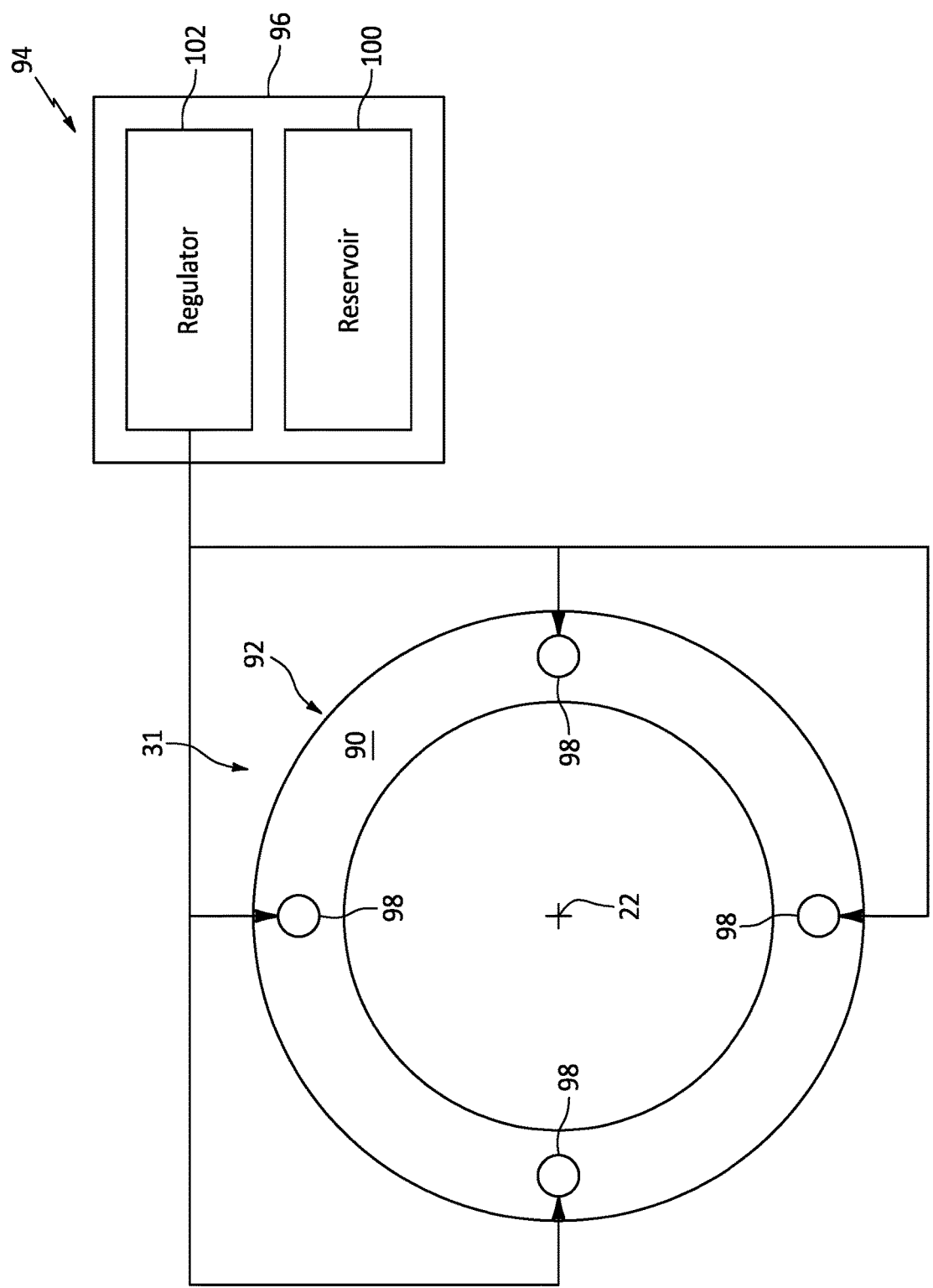
FIG. 3 is a schematic illustration of a fuel system for the turbine engine.

Referring to FIG. 3, the turbine engine 20 includes a fuel system 94 for delivering the fuel to the combustor 92. This fuel system 94 includes a fuel source 96 and one or more fuel injectors 98. The fuel source 96 of FIG. 3 includes a fuel reservoir 100 and/or a fuel flow regulator 102; e.g., a valve. The fuel reservoir 100 is configured to store the fuel before, during and/or after turbine engine operation. The fuel reservoir 100, for example, may be configured as or otherwise include a tank, a cylinder, a pressure vessel, a bladder or any other type of fuel storage container. The fuel flow regulator 102 is configured to direct and/or meter a flow of the fuel from the fuel reservoir 100 to the fuel injectors 98. The fuel injectors 98 may be arranged circumferentially about the axis 22 in an array. Each fuel injector 98 is configured to direct the fuel received from the fuel source 96 into the combustion chamber 90 for mixing with the compressed core air to provide the fuel-air mixture.

The turbine engine 20 of FIG. 1 may be configured as a non-hydrocarbon turbine engine/a hydrocarbon free turbine engine. The turbine engine 20, for example, may be configured as a hydrogen fueled turbine engine. The fuel injected into the combustion chamber 90 by the fuel injectors 98 (see FIG. 2), for example, may be hydrogen ($H_2$) fuel; e.g., $H_2$ gas. The present disclosure, however, is not limited to hydrogen fueled turbine engines nor to non-hydrocarbon turbine engines. The turbine engine 20, for example, may also or alternatively be fueled by another non-hydrocarbon fuel such as, but not limited to, ammonia ($NH_3$). The turbine engine 20 may still also or alternatively be fueled using any other fuel, including hydrocarbon fuels (e.g., kerosene, jet fuel, sustainable aviation fuel, etc.), which produces combustion products that include water ($H_2O$) vapor.

Figure 4:
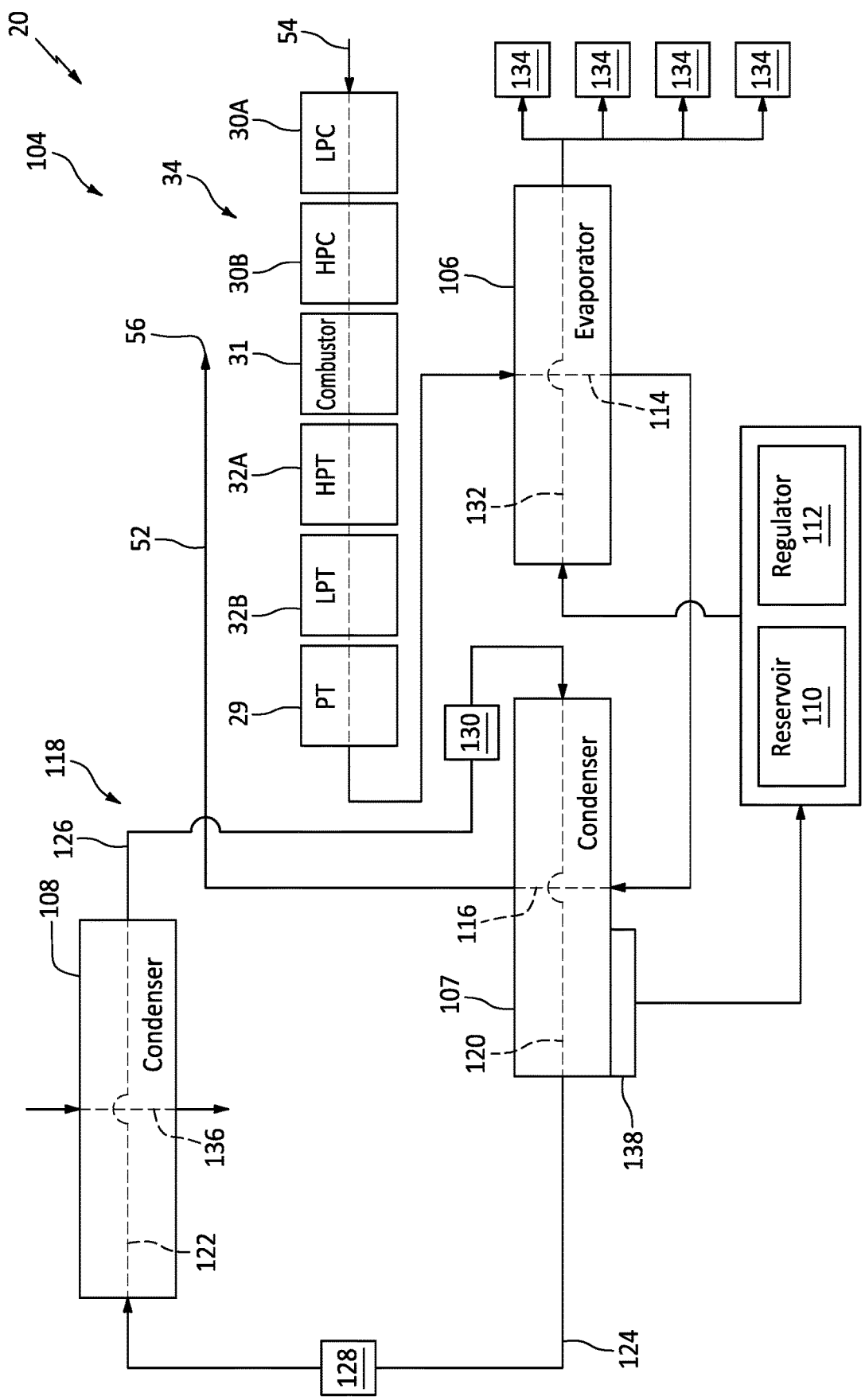
FIG. 4 is a schematic illustration of a water and heat energy recovery system arranged with other components of the turbine engine.

Referring to FIG. 4, the turbine engine 20 also includes a water and heat energy recovery system 104. This recovery system 104 is configured to recover at least some of the water vapor produced by the combustion of the fuel-air mixture within the combustion chamber 90 (see FIG. 2). The recovery system 104 is also configured to evaporate the recovered water using heat energy recuperated from the combustion products to provide steam for use in the engine core 34; e.g., in the combustor section 31. The recovery system 104 of FIG. 4, for example, includes a (e.g., annular or arcuate) water evaporator 106 and a (e.g., annular or arcuate) water condenser 107. The recovery system 104 may also include a (e.g., annular or arcuate) refrigerant condenser 108, a water reservoir 110 and/or a system flow regulator 112 (e.g., a pump and/or a valve).

The water evaporator 106 and the water condenser 107 are fluidly coupled inline with the core flowpath 52. For example, the core flowpath 52 of FIG. 4 extends from the PT section 29, sequentially through a gas (e.g., combustion products) flowpath 114 of the water evaporator 106 and a gas (e.g., combustion products) flowpath 116 of the water condenser 107, to the core flowpath exhaust 56.

The water condenser 107 and the refrigerant condenser 108 are configured together in a refrigerant flow circuit 118. For example, a working fluid (e.g., refrigerant) flowpath 120 of the water condenser 107 and a working fluid (e.g., refrigerant) flowpath 122 of the refrigerant condenser 108 are fluidly coupled in a loop by a working fluid first passage 124 and a working fluid second passage 126. The first passage 124 may direct a working fluid (e.g., refrigerant or another coolant) from the water condenser 107 and its fluid flowpath 120 to the refrigerant condenser 108 and its fluid flowpath 122. The second passage 126 may direct the working fluid from the refrigerant condenser 108 and its fluid flowpath 122 to the water condenser 107 and its fluid flowpath 120. This refrigerant flow circuit 118 may also include a refrigerant flow regulator 128, 130 (e.g., a compressor, a pump and/or a valve) arranged inline with one or both of the working fluid passages 124, 126 to regulate circulation of the working fluid through the water condenser 107 and the refrigerant condenser 108.

The water reservoir 110 is configured to hold water before, during and/or after turbine engine operation. The water reservoir 110, for example, may be configured as or otherwise include a tank, a cylinder, a pressure vessel, a bladder or any other type of water storage container. The water reservoir 110 of FIG. 4 is fluidly coupled with and between the water condenser gas flowpath 116 and a water flowpath 132 of the water evaporator 106. The system flow regulator 112 is arranged with the water reservoir 110, and configured to direct and/or meter a flow of the water from the water reservoir 110 to one or more other components 134 of the turbine engine 20. One or more of the turbine engine components 134 may each be configured as or otherwise include a steam injector. Each steam injector may be configured to inject the steam into the combustion chamber 90 (see FIG. 2). One or more of the turbine engine components 134 may also or alternatively be configured as an outlet for introducing the steam for cooling the combustor 92; e.g., a combustor wall, etc. The present disclosure, however, is not limited to the foregoing exemplary turbine engine components 134 which utilize the steam. In particular, various other uses for steam in a turbine engine are known in the art, and the present disclosure is not limited to any particular one thereof.

During operation of the recovery system 104, relatively cool air is directed into an air flowpath 136 of the refrigerant condenser 108. The working fluid is directed into the refrigerant condenser fluid flowpath 122. The refrigerant condenser 108 exchanges heat energy between the air flowing within the refrigerant condenser air flowpath 136 and the working fluid flowing within the refrigerant condenser fluid flowpath 122. The working fluid flowing within the refrigerant condenser fluid flowpath 122 is typically warmer than the air flowing within the refrigerant condenser air flowpath 136. The refrigerant condenser 108 is thereby operable to cool the working fluid using the air. This air may be received (e.g., scooped and/or bled) from the bypass flowpath 50 as shown, for example, in FIG. 5A. Alternatively, the air may be received (e.g., scooped and/or ingested) from the external environment 64 as shown, for example, in FIG. 5B.

The cooled working fluid is directed into the water condenser fluid flowpath 120. The relatively hot combustion products, including the water vapor, are directed into the water condenser gas flowpath 116. The water condenser 107 exchanges heat energy between the working fluid flowing within the water condenser fluid flowpath 120 and the combustion products flowing within the water condenser gas flowpath 116. The combustion products flowing within the water condenser gas flowpath 116 are typically warmer than the working fluid flowing within the water condenser fluid flowpath 120. The water condenser 107 is thereby operable to cool the combustion products using the working fluid. This cooling of the combustion products may condense at least some of the water vapor (e.g., the gaseous water) flowing within the water condenser gas passage 116 into liquid water droplets. At least some or all of the liquid water may be collected and separated from the remaining gaseous combustion products by a separator 138 and subsequently directed to the water reservoir 110 for (e.g., temporary) storage. Here, the separator 138 is configured as or otherwise includes a gutter paired with the water condenser 107. However, various other types of separators are known in the art, and the present disclosure is not limited to any particular ones thereof.

The system flow regulator 112 directs the water from the water reservoir 110 into and through the water evaporator water flowpath 132. The relatively hot combustion products are further directed through the water evaporator gas flowpath 114, for example, prior to flowing through the water condenser gas flowpath 116. The water evaporator 106 exchanges heat energy between the water flowing within the water evaporator water flowpath 132 and the combustion products flowing within the water evaporator gas flowpath 114. The combustion products flowing within the water evaporator gas flowpath 114 are typically warmer than the liquid water flowing within the water evaporator water flowpath 132. The water evaporator 106 is thereby operable to heat the water using the combustion products and thereby recuperate the heat energy from the combustion products. This heating of the water may evaporate at least some or all of the liquid water flowing within the water evaporator water flowpath 132 into gaseous water-steam. At least some of this steam is directed to the turbine engine components 134 for use in the engine core 34; e.g., use in the combustor section 31.

Figure 6:
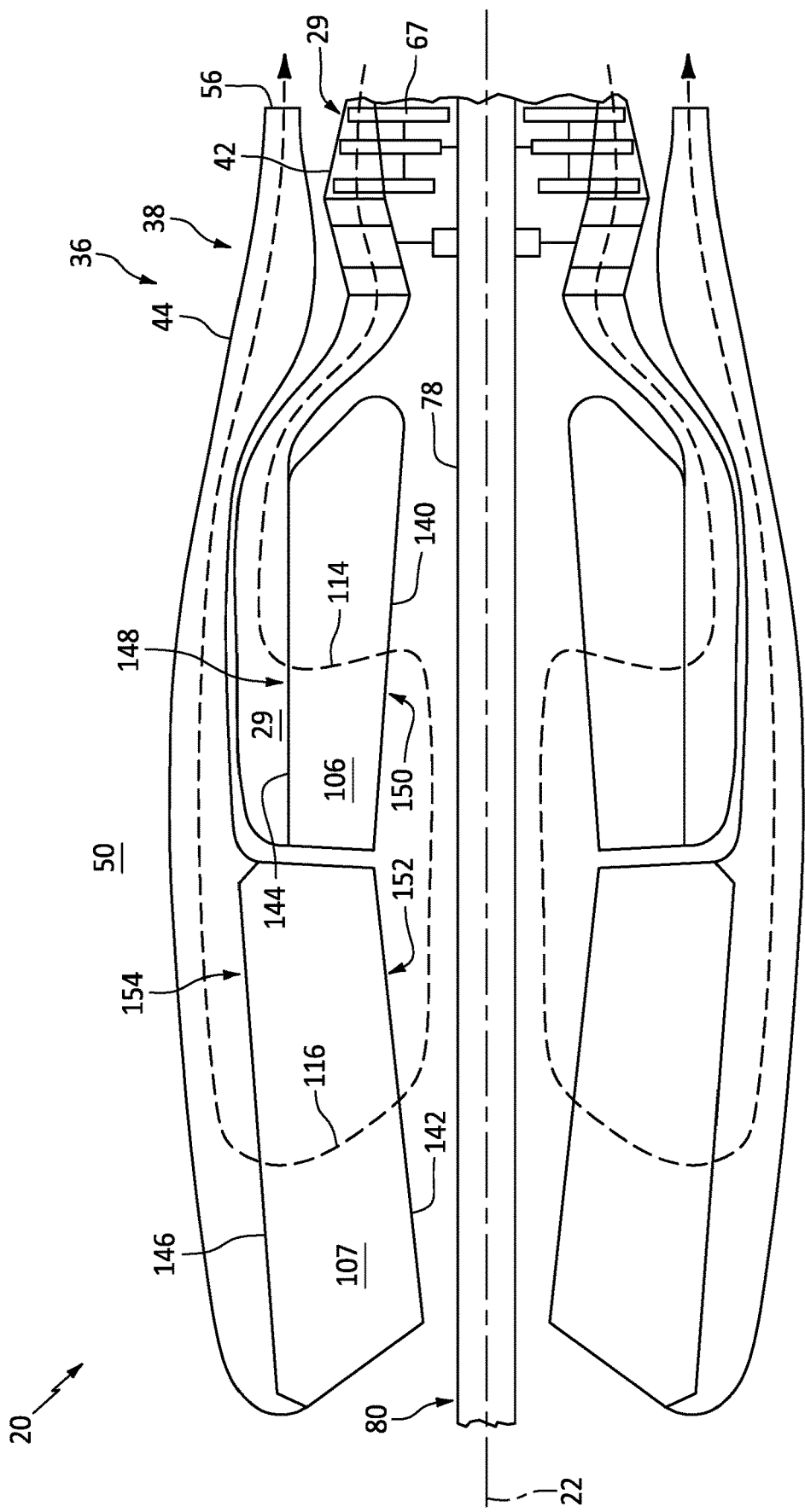
FIG. 6 is a partial schematic illustration of the turbine engine with an evaporator and a condenser within an inner housing structure.

Referring to FIG. 6, the water evaporator 106 and/or the water condenser 107 may be arranged at a central location within the turbine engine 20; e.g., a typical location for an engine core. Each heat exchanger 106, 107 of FIG. 2, for example, is positioned axially aft, downstream of the fan section 28 and axially forward, upstream of the PT section 29 and/or the engine core 34 and its core sections 30A-32B. More particularly, each heat exchanger 106, 107 is positioned axially between the fan section 28 and the PT section 29 along the axis 22. The water evaporator 106 may be positioned axially between the water condenser 107 and the PT section 29 and/or the engine core 34. The water condenser 107 may be position axially between the water evaporator 106 and the fan section 28. Each heat exchanger 106, 107 extends axially along and circumferentially about (e.g., completely around) the axis 22. Referring to FIG. 6, each heat exchanger 106, 107 extends radially between and to an inner side 140, 142 of the respective heat exchanger 106, 107 and an outer side 144, 146 of the respective heat exchanger 106, 107. With this arrangement, the fan rotating structure 80 and its PT shaft 78 may project axially along the axis 22 through a bore of each heat exchanger 106, 107. Each heat exchanger 106, 107 may thereby extend circumferentially about (e.g., circumscribe) and extend axially along (e.g., overlap) the fan rotating structure 80 and its PT shaft 78. The inner nacelle 44 may also house (e.g., circumscribe and/or axially overlap) the water evaporator 106 and/or the water condenser 107 beneath (e.g., radially inboard of) the bypass flowpath 50.

The water evaporator gas flowpath 114 of FIG. 6 extends radially through the water evaporator 106 between and to an (e.g., annular) inlet 148 into the water evaporator gas flowpath 114 and an (e.g., annular) outlet 150 from the water evaporator gas flowpath 114. The inlet 148 may be disposed at the outer side 144 of the water evaporator 106. The outlet 150 may be disposed at the inner side 140 of the water evaporator 106. With this arrangement, the core flowpath 52 may extend radially through the water evaporator 106. More particularly, the core flowpath 52 of FIG. 6 extends radially in an inward direction (e.g., towards the axis 22) into the water evaporator 106 through its inlet 148. The core flowpath 52 of FIG. 6 also extends radially in the inward direction out of the water evaporator 106 through the outlet 150. By passing radially through the water evaporator 106, a heat exchange surface area of the water evaporator 106 may be increased (e.g., maximized) to promote enhanced heat transfer between the combustion products and the water without, for example, increasing a radial size of the inner nacelle 44.

The water condenser gas flowpath 116 of FIG. 6 extends radially through the water condenser 107 between and to an (e.g., annular) inlet 152 into the water condenser gas flowpath 116 and an (e.g., annular) outlet 154 from the water condenser gas flowpath 116. The inlet 152 may be disposed at the inner side 142 of the water condenser 107. The outlet 154 may be disposed at the outer side 146 of the water condenser 107. With this arrangement, the core flowpath 52 may extend radially through the water condenser 107. More particularly, the core flowpath 52 of FIG. 6 extends radially in an outward direction (e.g., away from the axis 22) into the water condenser 107 through its inlet 152. The core flowpath 52 of FIG. 6 also extends radially in the outward direction out of the water condenser 107 through the outlet 154. By passing radially through the water condenser 107, a heat exchange surface area of the water condenser 107 may be increased (e.g., maximized) to promote enhanced heat transfer between the combustion products and the working fluid without, for example, increasing a radial size of the inner nacelle 44.

Figure 5A:
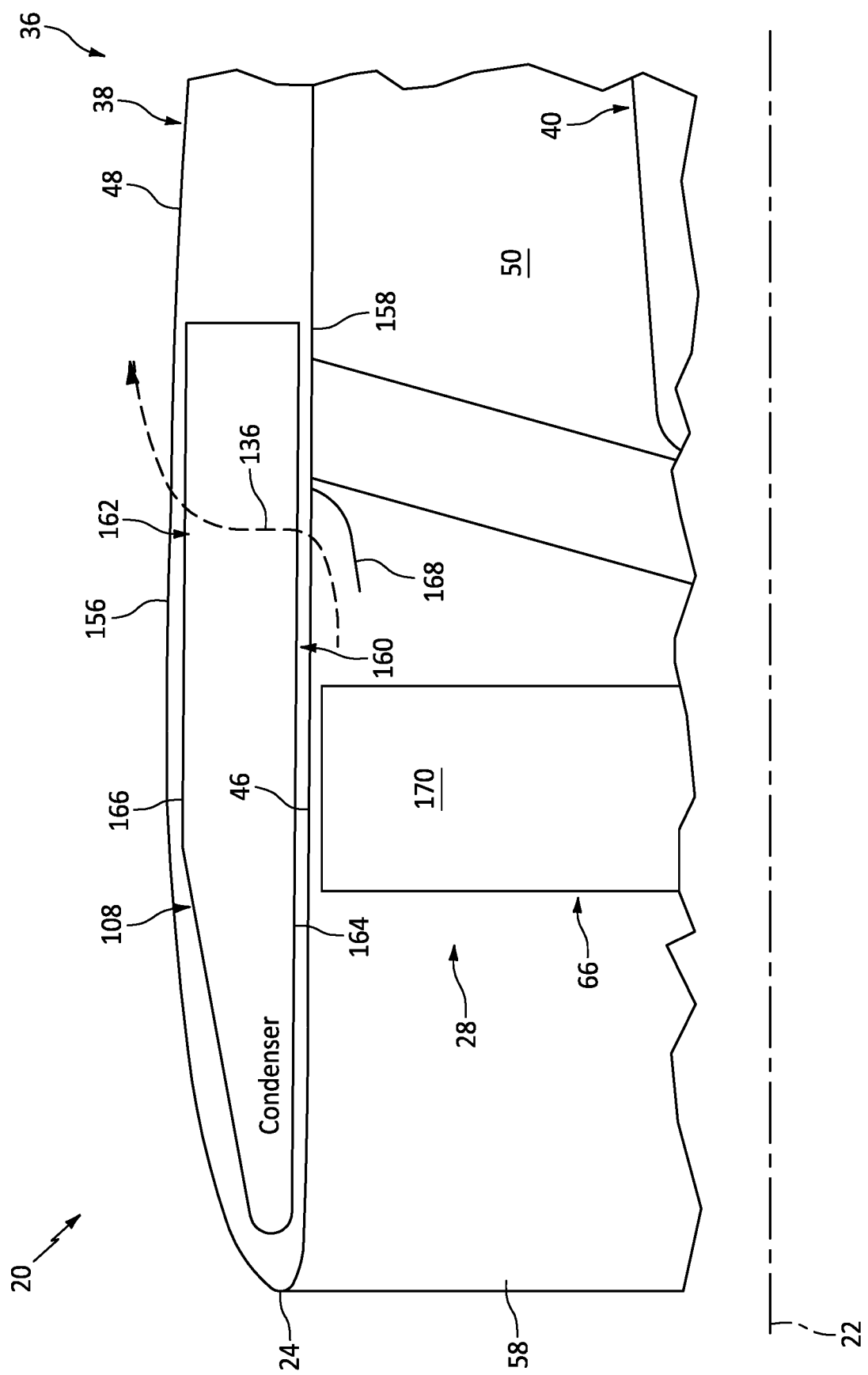
FIGS. 5A and 5B are partial side sectional illustrations of a portion of the turbine engine with a refrigerant condenser and various inlet scoop arrangements.
Figure 5B:
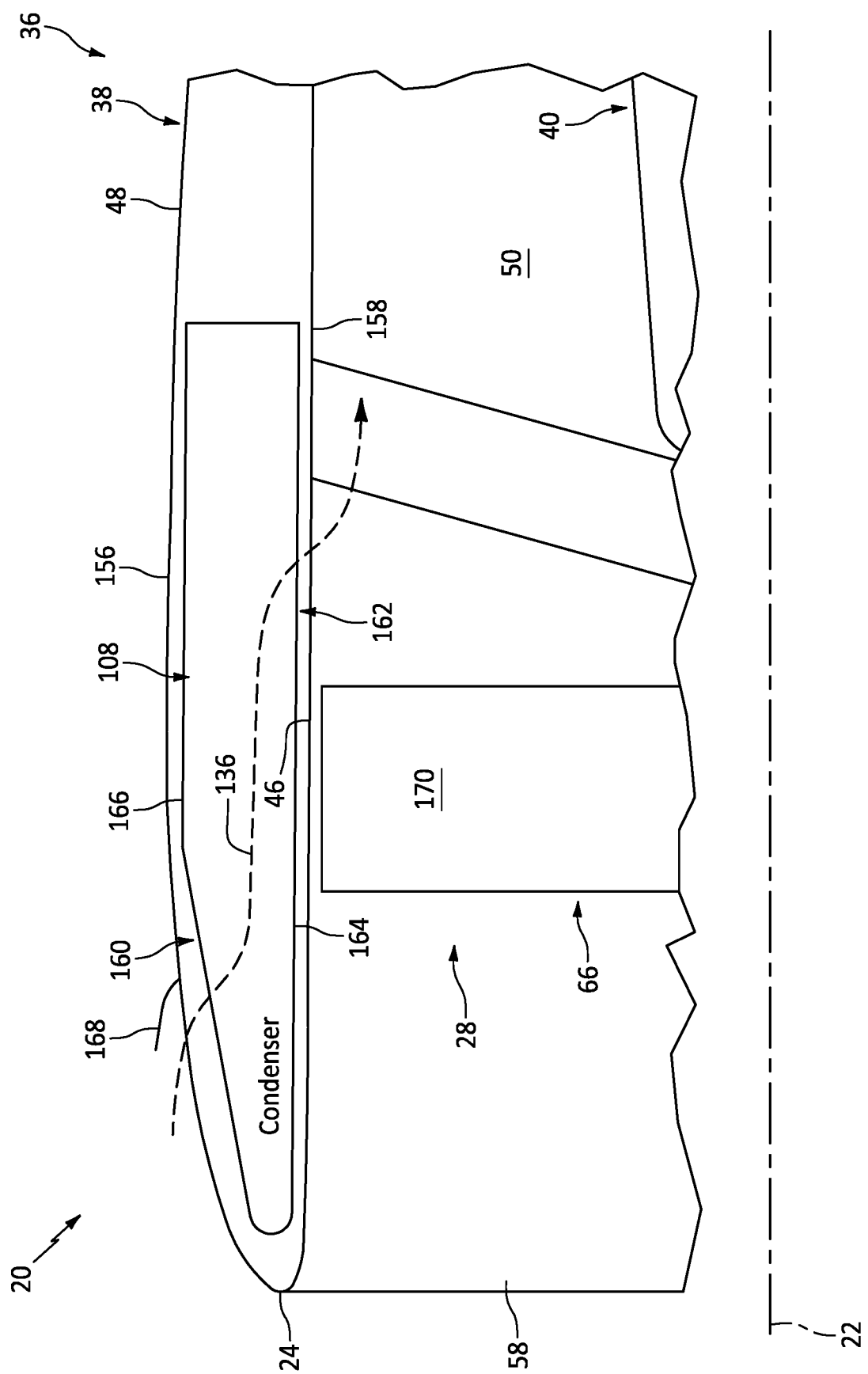

Referring to FIGS. 5A and 5B, the refrigerant condenser 108 may be arranged at an outer peripheral location within the turbine engine 20. The refrigerant condenser 108 of FIGS. 5A and 5B, for example, is positioned radially outboard of the fan section 28 and/or the bypass flowpath 50. The refrigerant condenser 108, for example, may be positioned radially between (A) an outer skin 156 of the outer nacelle 48 and (B) the outer case 46 and/or an inner skin 158 of the outer nacelle 48. With this arrangement, the refrigerant condenser 108 may extend circumferentially about (e.g., circumscribe) and/or extend axially along (e.g., overlap) the fan section 28 and its fan rotor 66 and/or the bypass flowpath 50.

The refrigerant condenser air flowpath 136 of FIGS. 5A and 5B extends radially through the refrigerant condenser 108 between and to an (e.g., annular) inlet 160 into the refrigerant condenser air flowpath 136 and an (e.g., annular) outlet 162 from the refrigerant condenser air flowpath 136. Referring to FIG. 5A, the inlet 160 may be disposed at an inner side 164 of the refrigerant condenser 108. The outlet 162 may be disposed at an outer side 166 of the refrigerant condenser 108. With this arrangement, the refrigerant condenser air flowpath 136 may extend radially through the refrigerant condenser 108. Here, the inlet 160 is adjacent an outer peripheral side of the bypass flowpath 50. An inlet scoop 168 is provided to direct a portion of the bypass air into the inlet 160. Alternatively, referring to FIG. 5B, the inlet 160 may be disposed at the outer side 166 of the refrigerant condenser 108. The outlet 162 may be disposed at the inner side 164 of the refrigerant condenser 108. With this arrangement, the refrigerant condenser air flowpath 136 may extend radially through the refrigerant condenser 108. Here, the inlet 160 is adjacent an exterior side of the turbine engine 20 and its outer nacelle 48. The inlet scoop 168 is provided to direct a portion of the ambient air from outside of the turbine engine 20 into the inlet 160.

Figure 7:
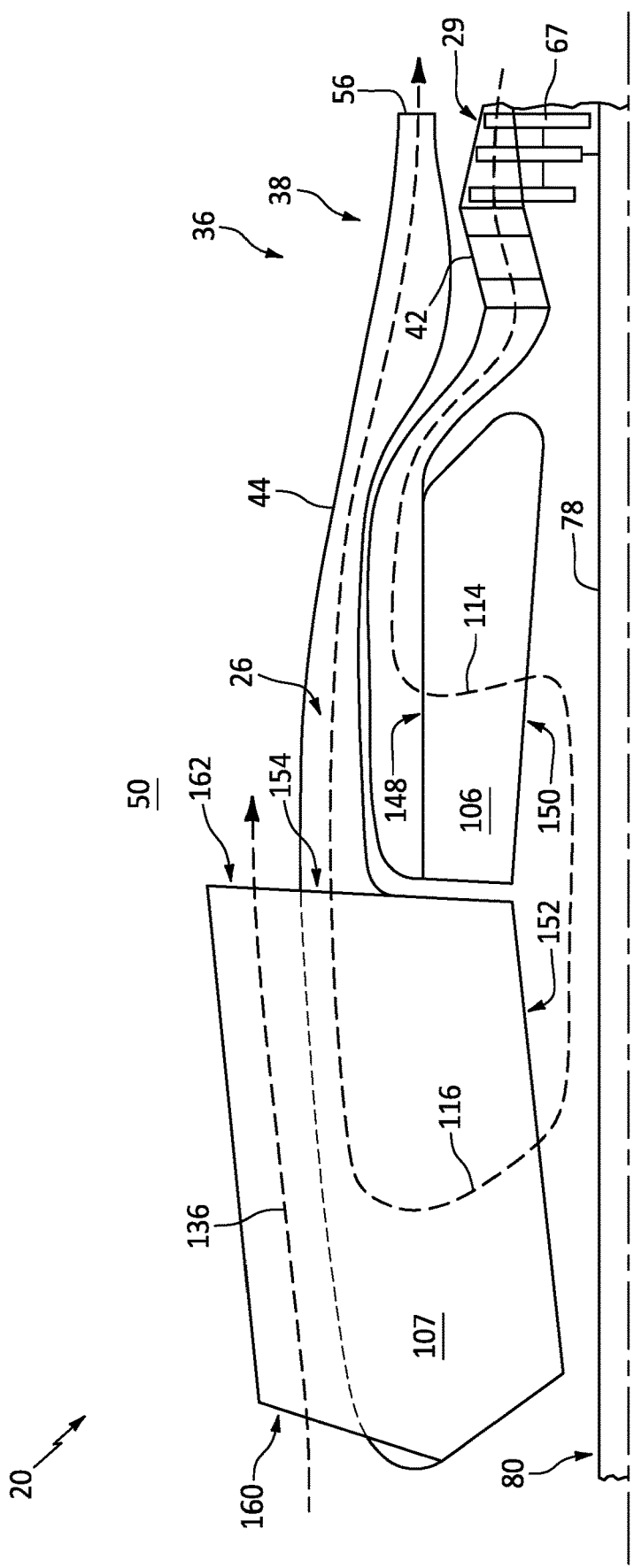
FIG. 7 is a partial schematic illustration of the turbine engine with the evaporator and an alternative condenser.

The refrigerant condenser 108 is described above as a discrete component from the water condenser 107. However, referring to FIG. 7, it is contemplated the refrigerant condenser 108 may alternatively be omitted. The water condenser 107 of FIG. 7, for example, may be extended into the bypass flowpath 50 and operable to transfer heat energy between the bypass air and the combustion products for condensing the water vapor out of the combustion products.

In some embodiments, referring to FIG. 1, the engine core 34 may be configured as a replaceable module. The engine core 34, for example, may be configured to be installed and removed by attaching and removing the engine core 34 from a portion of the inner case 42 surrounding the PT rotor 67 (see FIG. 2). With such an arrangement, turbine engine downtime may be reduced by, for example, swapping a used engine core out for a replacement engine core. The used engine core may then be inspected and/or repaired at another location and/or at another time while the turbine engine 20 may continue to operate with the replacement engine core. This arrangement is facilitated by configuring the PT rotor 67 of FIG. 2 as a free rotor; e.g., a rotor decoupled from the core rotating structures 84 and 88. Configuring the PT rotor 67 as a free rotor may also reduce likelihood of damage to the engine core 34 in an unlikely event of foreign object damage (FOD) to the fan rotor 66 and its fan blades 170.

Referring to FIG. 2, in some embodiments, the engine core 34 may be arranged coaxial with the fan rotor 66 and the geartrain 74. The present disclosure, however, is not limited to such an exemplary arrangement. For example, a centerline of the engine core 34 may alternatively be angularly offset from and/or (e.g., radially) displaced from a centerline of the fan rotor 66 and/or a centerline of the geartrain 74.

The turbine engine 20 is generally described above as a turbofan turbine engine. The present disclosure, however, is not limited to such an exemplary turbofan turbine engine configuration. The fan rotor 66, for example, may be configured as another type of propulsor rotor for generating propulsive thrust. Furthermore, the recovery system 104 may be included in a turbine engine configured with a single spool, with a dual spool (e.g., see FIG. 2), or with a more than two spool engine core. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A turbine engine, comprising:
    a fan section;
    a turbine engine core configured to power the fan section, the turbine engine core including a core compressor section, a core combustor section and a core turbine section;
    an evaporator arranged axially along an axis between the fan section and the turbine engine core;
    a condenser arranged axially along the axis between the fan section and the turbine engine core;
    a core flowpath extending, in a downstream direction, sequentially through the core compressor section, the core combustor section, the core turbine section, the evaporator and the condenser, wherein the core flowpath extends, in the downstream direction, radially inward towards the axis into the evaporator; and
    a bypass flowpath fluidly coupled with and downstream of the fan section, the bypass flowpath radially outboard of and extending axially along the evaporator and the condenser;
    wherein the core flowpath extends, in the downstream direction, radially outward away from the axis through the condenser.

2. The turbine engine of claim 1, wherein the condenser is arranged axially between the fan section and the evaporator.

3. The turbine engine of claim 1, wherein the evaporator extends circumferentially about the axis.

4. The turbine engine of claim 1, wherein the condenser extends circumferentially about the axis.

5. The turbine engine of claim 1, further comprising:
    a recovery system including the condenser and the evaporator;
    the condenser configured to condense water vapor flowing through the core flowpath into water, and the recovery system configured to collect the water; and
    the evaporator configured to evaporate at least some of the water into steam, and the recovery system configured to provide the steam to the turbine engine core.

6. The turbine engine of claim 5, wherein the recovery system is configured to provide the steam to the core combustor section.

7. The turbine engine of claim 1, further comprising a fuel system configured to inject hydrogen fuel into a combustion chamber of the core combustor section for combustion.

8. The turbine engine of claim 1, further comprising:
a flow circuit including the condenser and a second condenser, the flow circuit configured to circulate a working fluid through the condenser and the second condenser;
the second condenser arranged radially outboard of at least one of the fan section or the bypass flowpath.

9. The turbine engine of claim 8, further comprising a scoop configured to direct air from the fan section into the second condenser.

10. The turbine engine of claim 8, further comprising a scoop configured to direct air from outside of the turbine engine into the second condenser.

11. The turbine engine of claim 1, wherein
the core flowpath extends to a core flowpath exhaust; and
the bypass flowpath extends to a bypass flowpath exhaust disposed radially outboard and axially forward of the core flowpath exhaust.

12. The turbine engine of claim 1, wherein the turbine engine core has a reverse flow configuration.

13. The turbine engine of claim 1, wherein the core turbine section is arranged axially between the evaporator and the core compressor section.

14. The turbine engine of claim 1, further comprising:
a power turbine section arranged axially between the evaporator and the turbine engine core; and
a rotating structure including a fan rotor and a power turbine rotor, the fan rotor within the fan section and the power turbine rotor within the power turbine section.

15. A turbine engine, comprising:
a first rotating structure rotatable about an axis, the first rotating structure including a propulsor rotor and a power turbine rotor;
a turbine engine core including a second rotating structure and a combustor, the second rotating structure including a core compressor rotor and a core turbine rotor, and the power turbine rotor arranged axially between the propulsor rotor and the second rotating structure;
an evaporator arranged axially between the propulsor rotor and the power turbine rotor, the evaporator comprising an evaporator inlet located a first radial distance from the axis;
a condenser arranged axially between the propulsor rotor and the power turbine rotor, the condenser comprising condenser inlet located a second radial distance from the axis that is less than the first radial distance; and
a core flowpath extending sequentially across the core compressor rotor, the combustor, core turbine rotor, the power turbine rotor, the evaporator and the condenser.

16. The turbine engine of claim 15, further comprising:
a fan section comprising the propulsor rotor; and
a bypass flowpath fluidly coupled with and downstream of the fan section, the bypass flowpath radially outboard of and extending axially along the evaporator and the condenser.

17. A turbine engine, comprising:
a fan section;
a turbine engine core configured to power the fan section, the turbine engine core including a core compressor section, a core combustor section and a core turbine section;
an evaporator extending circumferentially about an axis;
a condenser extending circumferentially about the axis;
a core flowpath extending sequentially through the core compressor section, the core combustor section, the core turbine section, the evaporator and the condenser, the core flowpath extending in a radial inward direction through the evaporator, and the core flowpath extending in a radial outward direction through the condenser; and
a bypass flowpath fluidly coupled with and downstream of the fan section, the bypass flowpath radially outboard of and extending axially along the evaporator and the condenser.

18. The turbine engine of claim 17, wherein at least one of
the evaporator is arranged axially between the fan section and the turbine engine core; or
the condenser is arranged axially between the fan section and the turbine engine core.

* * * * *